(12) United States Patent
Hong et al.

(10) Patent No.: US 6,876,420 B2
(45) Date of Patent: Apr. 5, 2005

(54) IN-PLANE SWITCHING MODE LIQUID CRYSTAL DISPLAY DEVICE

(75) Inventors: Hyung-Ki Hong, Seoul (KR); Jin-Youl Chung, Seoul (KR)

(73) Assignee: LG. Philips LCD Co., Ltd., Seoul (KR)

( * ) Notice: Subject to any disclaimer, the term of this patent is extended or adjusted under 35 U.S.C. 154(b) by 0 days.

(21) Appl. No.: 10/423,040

(22) Filed: Apr. 25, 2003

(65) Prior Publication Data

US 2003/0234903 A1 Dec. 25, 2003

(30) Foreign Application Priority Data

Jun. 25, 2002 (KR) .............................. 10-2002-0035764
Jul. 3, 2002 (KR) .............................. 10-2002-0038419

(51) Int. Cl.[7] ........................................... G02F 1/1343
(52) U.S. Cl. ..................................................... 349/141
(58) Field of Search ......................................... 349/141

(56) References Cited

U.S. PATENT DOCUMENTS

| | | | |
|---|---|---|---|
| 5,598,285 A | 1/1997 | Kondo et al. | |
| 5,745,207 A | 4/1998 | Asada et al. | |
| 5,805,247 A | 9/1998 | Oh-e et al. | |
| 5,831,701 A | 11/1998 | Matsuyama et al. | |
| 5,838,037 A | 11/1998 | Masutani et al. | |
| 5,946,060 A | 8/1999 | Nishiki et al. | |
| 5,990,987 A | 11/1999 | Tanaka | |
| 6,028,653 A | 2/2000 | Nishida | |
| 6,040,887 A | 3/2000 | Matsuyama et al. | |
| 6,097,454 A | 8/2000 | Zhang et al. | |
| 6,266,166 B1 | 7/2001 | Katsumata et al. | |
| 6,281,958 B1 * | 8/2001 | Nakajima | 349/141 |
| 6,292,245 B1 * | 9/2001 | Lee et al. | 349/139 |
| 6,317,182 B1 * | 11/2001 | Shimizu et al. | 349/141 |
| 2003/0086045 A1 * | 5/2003 | Ono et al. | 349/141 |

FOREIGN PATENT DOCUMENTS

| | | |
|---|---|---|
| JP | 9-5764 | 1/1997 |
| JP | 9-73101 | 3/1997 |

OTHER PUBLICATIONS

S.H. Lee, et al., "High=Transmittance, Wide–Viewing–Angle Nematic Liquid Crystal Display Controlled by Fringe–Field" Asia Display 1998, pp. 371–374.

S. Matsumoto, et al., "LP–A Display Characteristics of In–Plane–Switching (IPS) LCDs and a Wide–Viewing–Angle 14.5–in. IPS TFT–LCD." Euro Display 1996, pp. 445–448.

H. Wakamoto, et al. "An Advanced In–Plane–Switching Mode TFT–LCD." SID 1997 Digest, pp. 929–932.

R. Kiefer, et al. "In–Plane Switching of Nematic Liquid Crystals." Japan Display 1992, pp. 547–550.

M. Ohta, et al. "Development of Super–TFT–LCDs with In–Plane Switching Display Mode." Asia Display 1995, pp. 707–710.

M. Oh–e, et al. "S23–1 Principles and Characteristics of Electro–Optical Behaviour with In–Plane Switching Mode." Asia Display 1995, pp. 577–580.

S. Endoh et al., "Diagonal Super–TFT–LCDs with Mega Wide Viewing Angle and Fast Response Speed of 20ms". IDW '99, pp. 187–190.

* cited by examiner

*Primary Examiner*—Kenneth Parker
(74) *Attorney, Agent, or Firm*—Morgan, Lewis & Bockius LLP

(57) ABSTRACT

An in-plane switching mode liquid crystal display device includes a substrate; at least two gate lines disposed on the substrate; at least two data lines disposed on the substrate crossing the gate lines to define a pixel region; a driving device disposed in the pixel region; a plurality of first electrodes disposed in the pixel region; and a plurality of second electrodes disposed in the pixel region parallel with the first electrodes. At least one first electrode is overlapped with at least one second electrode. Further, each one of the first electrodes and a corresponding one of second electrodes defining an electric field in a direction parallel to a surface of the substrate.

34 Claims, 10 Drawing Sheets

FIG. 11

IN-PLANE SWITCHING MODE LIQUID CRYSTAL DISPLAY DEVICE

The present application claims the benefit of Korean Patent Application No. 2002-35764 filed in Korea on Jun. 25, 2002, and Korean Patent Application No. 2002-38419 filed in Korea on Jul. 3, 2002, which are hereby incorporated by reference.

BACKGROUND OF THE INVENTION

1. Field of the Invention

The present invention relates a liquid crystal display device, and in particular, to an in-plane switching mode liquid crystal display device with improved aperture ratio.

2. Discussion of the Related Art

Recently, with the development of various portable electronic equipment such as mobile phones, PDA's and a notebook computer, demands for flat panel display devices having light weight, small size and adaptability have correspondingly increased. LCD (liquid crystal displays), PDPs (plasma display panel, FED (field emission displays). VFD (vacuum fluorescent displays), etc. have been actively researched as the flat panel display devices. Among these the LCD presently the focus in the mass production.

The LCD has various display modes according to alignment of liquid crystal molecules. Among them, a TN (Twisted Nematic) mode is mainly used at present because of white-black display easiness, fast response time and low driving voltages. In the TN mode liquid crystal display device, when voltage is applied to liquid crystal molecules aligned at a surface of a substrate, the liquid crystal molecules are aligned at right angles to the substrate. Accordingly, when a voltage is applied, a viewing angle is reduced by refractive anisotropy of the liquid crystal molecules.

Figure 1A:
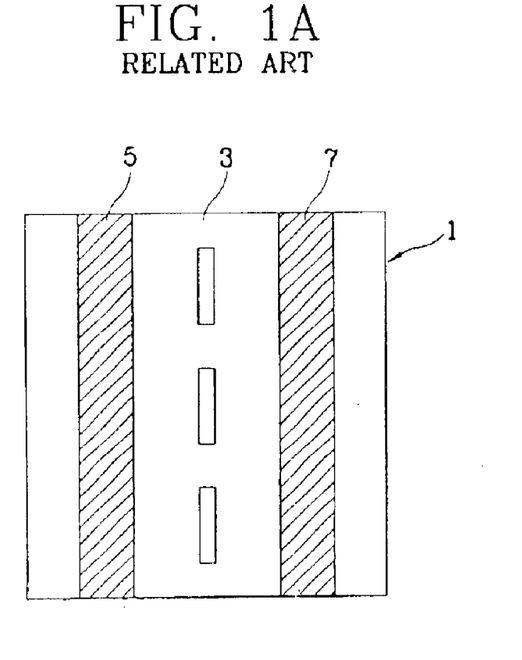
FIGS. 1A and 1B show a basic concept of an in-plane switching mode liquid crystal display device.
Figure 1B:
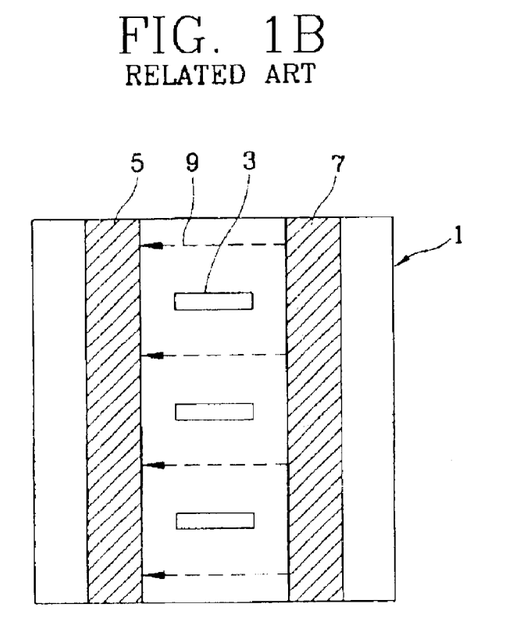

In order to solve the above-mentioned viewing angle problem, various liquid crystal display devices having wide viewing angle characteristics have been presented. Among them, an in-plane switching mode liquid crystal display device has been mass-produced. In the IPS mode liquid crystal display device, when a voltage is applied, viewing angle characteristics can be improved by aligning liquid crystal molecules on a plane by forming a horizontal electric field parallel to the plane of a substrate. FIGS. 1A and 1B show a basic concept thereof.

As depicted in FIG. 1A, in an IPS mode liquid crystal display panel 1, a common electrode 5 and a pixel electrode 7 are arranged parallel to a pixel. When a voltage is not applied to the pixel electrode 7 (there is no signal input), liquid crystal molecules 3 are arranged parallel to the common electrode 5 and the pixel electrode 7. In more detail, the liquid crystal molecules 3 are aligned at a certain angle to an extended direction of the common electrode 5 and the pixel electrode 7. When the liquid crystal molecules 3 are aligned completely parallel with the common electrode 5 and the pixel electrode 7, rotational direction of the liquid crystal molecules is not definite, and when a gray level signal is applied to the pixel electrode 7, aligning of the liquid crystal molecules is irregular along a whole liquid crystal layer. Accordingly, the actual liquid crystal molecules 3 have to be aligned at a specific angle with respect to the common electrode 5 and the pixel electrode 7. However, in the drawings, the liquid crystal molecules 3 are aligned parallel to the common electrode 5 and the pixel electrode 7 for convenience.

As depicted in FIG. 1B, when a voltage (signal) is applied to the pixel electrode 7 of the liquid crystal display panel 1 in which the liquid crystal molecules 3 are aligned parallel with the common electrode 5 and the pixel electrode 7, a horizontal electric field 9 parallel to the liquid crystal display panel 1 occurs between the common electrode 5 and the pixel electrode 7, and the liquid crystal molecules 3 are rotated according to the horizontal electric field. When a voltage is applied, the liquid crystal molecules 3 are rotated in the same plane accordingly to the horizontal electric field 9, and accordingly gray inversion due to refractive anisotropy can be prevented.

Figure 2A:
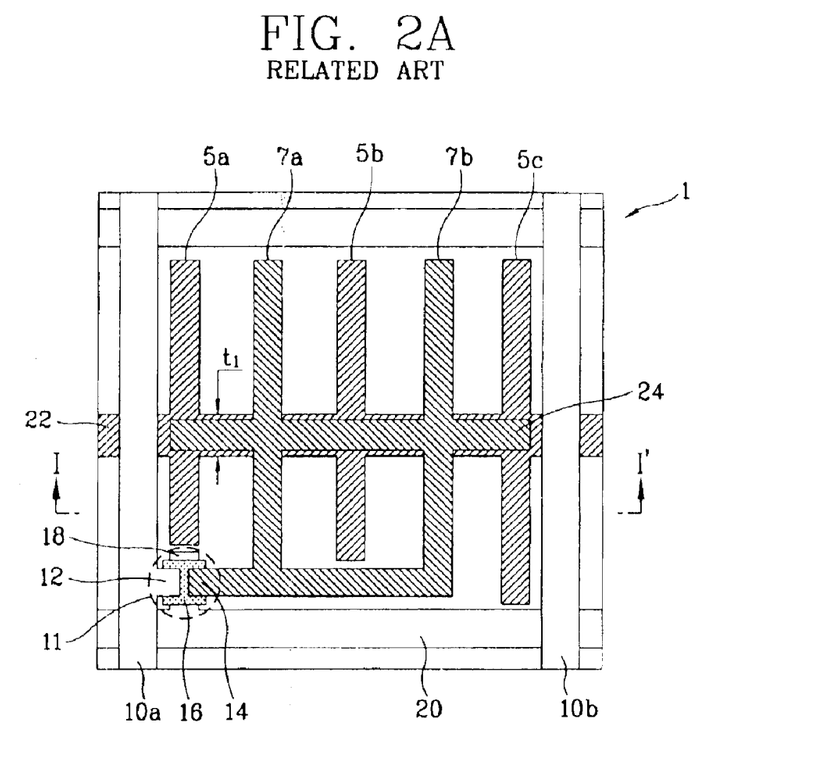
FIGS. 2A and 2B show a structure of the related art in-plane switching mode liquid crystal display device.
Figure 2B:
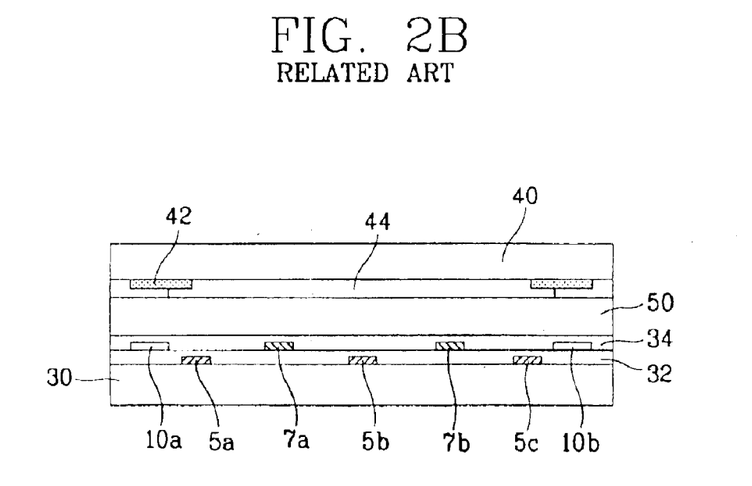

FIGS. 2A and 2B show structures of an IPS mode liquid crystal display panel, FIG. 2A shows a structure of one pixel in the liquid crystal display panel, and FIG. 2B is a sectional view taken along line I–I' in FIG. 2A.

As depicted in FIG. 2A, a pixel of the liquid crystal display panel 1 is defined by a data line 10 and a gate line 20. Only one pixel is shown in FIG. 2A. However, in the actual liquid crystal display panel 1, there are 'n' data lines 10 and 'm' gate lines 20, and the n×m-pixels are formed on the whole liquid crystal display panel 1. A thin film transistor 11 is formed at a cross region of the data line 10 and the gate line 20 in the pixel. The thin film transistor 11 includes a gate electrode 18 for receiving a scanning signal from the gate line 20, a semiconductor layer 16 formed on the gate electrode 18 and forming a channel layer by being activated according to the applied scanning signal, a drain electrode 14 formed on the semiconductor layer 16 and receiving a picture signal through the data line 10, and a source electrode 12. Accordingly, the thin film transistor 11 applies the picture signal received from the outside to a liquid crystal layer 50.

In the pixel, a first through third common electrodes 5a–5c arranged parallel to the data line as well as first and second pixel electrodes 7a, 7b. In addition, a common line 22 contacted to the first through third common electrodes 5a–5c, and a pixel electrode line 24 contacted to the first and second pixel electrodes 7a, 7b are arranged at the center of the pixel.

The common electrodes 5a–5c and the pixel electrodes 7a, 7b are not formed at the same plane. As depicted in FIG. 2B, the common electrodes 5a–5c are formed on a lower substrate 30 made of a transparent glass, etc., and the pixel electrodes 7a, 7b are formed on a gate insulating layer 32. In the meantime, because the common electrodes 5a–5c and the pixel electrodes 7a, 7b are respectively contacted to the common line 22 and the pixel electrode line 24, the common line 22 and the pixel electrode line 24 are respectively formed on the lower substrate 30 and the gate insulating layer 32.

Not shown in drawings, the gate electrode 18 of the thin film transistor is formed on the substrate 30, and the semiconductor layer 16 is formed on the gate insulating layer 32. In addition, the source electrode 12 and the drain electrode 14 are formed on the semiconductor layer 16. The common electrodes 5a–5c and the pixel electrodes 7a, 7b formed in the pixel regions can be respectively formed by a process different from that of the thin film transistor, but are usually formed by the same process. The common electrodes 5a–5c are formed in a process of the gate electrode 18 of the thin film transistor, and the pixel electrodes 7a, 7b are formed in a process of the source electrode 12 and the drain electrode 14. Accordingly, a whole process can be performed quickly.

In the liquid crystal display panel 1, when a scanning signal is applied to the thin film transistor through the gate line 20, the thin film transistor is turned on, a picture signal is transmitted to the pixel electrodes 7a, 7b through the data line 10, a horizontal electric field parallel to the plane of the substrate occurs between the common electrodes 5a–5c and the pixel electrodes 7a, 7b. Accordingly the liquid crystal molecules are rotated according to the electric field direction.

In the meantime, when a picture signal is input to the pixel electrodes 7a, 7b, an electric field occurs not only between the common electrodes 5a–5c and the pixel electrodes 7a, 7b but also between the pixel electrodes 7a, 7b and the data lines 10a, 10b. However, because the electric field between the pixel electrodes 7a, 7b and the data lines 10a, 10b distorts the whole horizontal electric field, the liquid crystal molecules are not aligned parallel to the substrate. Accordingly, a directional cross talk occurs.

To solve the problem, the first common electrode 5a has to be arranged between the first pixel electrode 7a and the data line 10a, and the third common electrode 5c has to be arranged between the second pixel electrode 7b and the data line 10b to shield the electric field from the data lines 10a, 10b. To shield the electric field efficiently, the first common electrode 5a and the third common electrode 5c respectively abut the data lines 10a, 10b. Accordingly, a region between the first common electrode 5a and the data line 10a as well as and a region between the third common electrode 5c and the data line 10b are very small. As a result, the picture of the liquid crystal display device is not displayed in these regions.

On an upper substrate 40, a black matrix 42 and a color filter layer 44 are formed. The black matrix 42 prevents light from being leaked to the thin film transistor region and pixels. The color filter layer 44 implements an actual color to be formed. A liquid crystal layer 50 is formed between the lower substrate 30 and the upper substrate 40. Accordingly, an IPS mode liquid crystal display panel is completed. As shown, the black matrix 42 is extended to not only the data lines 10a, 10b but also the first common electrode 5a and the third common electrode 5c. Thus, light can be prevented from being leaked to regions between the common electrodes 5a, 5c and the data lines 10a, 10b.

The IPS mode liquid crystal display device has a lower aperture ratio in comparison with that of a TN mode liquid crystal display device. In the TN mode liquid crystal display device, the pixel electrodes and the common electrodes for applying signals to the liquid crystal layer are made of ITO (indium tin oxide) as transparent metal. In contrast, in the IPS mode liquid crystal display device, the common electrodes 5a–5c and the pixel electrodes 7a, 7b are made of an opaque metal (gate metal or source metal). As a result, an aperture ratio is lowered as much as regions in which the common electrodes 5a–5c and the pixel electrodes 7a, 7b are formed. In particular, because the common electrodes 5a, 5c are formed abutting on the data lines 10a, 10b, the number of common electrodes arranged in one pixel is greater than the number of pixel electrodes. Therefore, an aperture ratio is reduced even more.

SUMMARY OF THE INVENTION

Accordingly, the present invention is directed to an in-plane switching mode liquid crystal display device that substantially obviates one or more of the problems due to limitations and disadvantages of the related art.

An object of the present invention to provide an in-plane switching mode liquid crystal display device with improved aperture ratio and an increased light transmittance region.

Another object of the present invention is to provide an in-plane switching mode liquid crystal display device that easily and efficiently provides a regular storage capacitor.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, an in-plane switching mode liquid crystal display device comprises a substrate; at least two gate lines disposed on the substrate; at least two data lines disposed on the substrate crossing the gate lines to define a pixel region; a driving device disposed in the pixel region; a plurality of first electrodes disposed in the pixel region; and a plurality of second electrodes disposed in the pixel region parallel with the first electrodes and at least one first electrode being overlapped with at least one second electrode, each one of the first electrodes and a corresponding one of second electrodes defining an electric field in a direction parallel to a surface of the substrate.

In another aspect, an in-plane switching mode liquid crystal display device comprises a substrate; at least two gate lines disposed on the substrate; at least two data lines disposed on the substrate crossing the gate lines to define a pixel region; a driving device defined in the pixel region; at least one first line disposed in the pixel region; at least one second line disposed in the pixel region, the first and second line defining a first storage capacitor and dividing the pixel region into first and second regions; a plurality of first electrodes disposed in the pixel region substantially parallel to the data lines and connected with the first line; and a plurality of second electrodes disposed in the pixel region substantially parallel to the data lines and connected with the second line, the first and second electrodes having at least two overlap regions to define a second storage capacitor.

In another aspect, an in-plane switching mode liquid crystal display device comprises a plurality of pixel regions defined by plurality of gate lines crossing with a plurality data lines; a driving device in each pixel region; and a plurality of first electrodes and second electrodes arranged parallel with each other in each pixel region to form an electric field in a plane defined by the crossing gate and data lines, at least two first electrodes and at least two second electrodes being overlapped to define a first and second overlap regions, the first and second overlap regions being symmetric with each other.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE EXEMPLARY EMBODIMENTS

Reference will now be made in detail to the exemplary embodiments of the present invention, examples of which are illustrated in the accompanying drawings.

In general, in an IPS mode liquid crystal display device, light transmits through a region between a common electrode and a pixel electrode. A light transmittance region is varied according to the number of common electrodes and pixel electrodes, and a transmittance is generally shown as block. For example, in an IPS mode liquid crystal display device depicted in FIGS. 2A and 2B, three common electrodes and two pixel electrodes are formed, and there are four light transmittance regions. Herein, an IPS mode liquid crystal display device having four transmittance regions (a 4-block liquid crystal display device) is described but not intended as limiting the present invention to a specific structure of a liquid crystal display device but rather for convenience. An IPS mode liquid crystal display device in accordance with the present invention can be used for not only a 4-block or a 6-block or a 8-block IPS mode liquid crystal display device or any other block liquid crystal display device. Hereinafter, a specific-block IPS mode liquid crystal display device will be described for convenience, but the present invention is not intended to be limited by this.

In the present invention, by increasing a light transmittance region and each block region, an aperture ratio of an IPS mode liquid crystal display device can be improved. In particular, by overlapping a common electrode with a portion of a pixel electrode, an aperture ratio can be improved. In the meantime, a storage capacitance is formed at a region in which the common electrode is overlapped with the pixel electrode. In general, in the related art IPS mode liquid crystal display device, by making a common line and a pixel electrode line overlap with each other in a pixel, a storage capacitor is formed. Accordingly, to secure a set storage capacitor, an overlapping region of the common line and the pixel electrode line has to be greater than a certain range, and the common line and the pixel electrode line should have a width greater than a certain width. However, in the present invention, because a portion of the storage capacitor is formed by overlapping the common electrode with the pixel electrode, an overlapping region of the common line and the pixel electrode line can be reduced. Accordingly, it is possible to reduce width of the common line and the pixel electrode line, and an aperture ratio of the liquid crystal display device can be further improved.

One block is reduced by overlapping the common electrode with the pixel electrode. For example, in the related art 4-block IPS mode liquid crystal display device, because one block is removed, it becomes a 3-block IPS mode liquid crystal display device. In the related art 6-block IPS mode liquid crystal display device, because one block is removed, it becomes a 5-block IPS mode liquid crystal display device. As described above, instead of one-decreased block as a light transmittance region, light transmittance regions of other blocks are increased. Herein, because the increased light transmittance regions include not only the light transmittance region of the removed block but also an overlap region of the common electrode and the pixel electrode, total light transmittance regions of the liquid crystal display device are increased. Accordingly, aperture ratio is improved.

Hereinafter, the exemplary embodiment of an IPS mode liquid crystal display device in accordance with the present invention will be described in detail with reference to accompanying drawings.

Figure 3A:
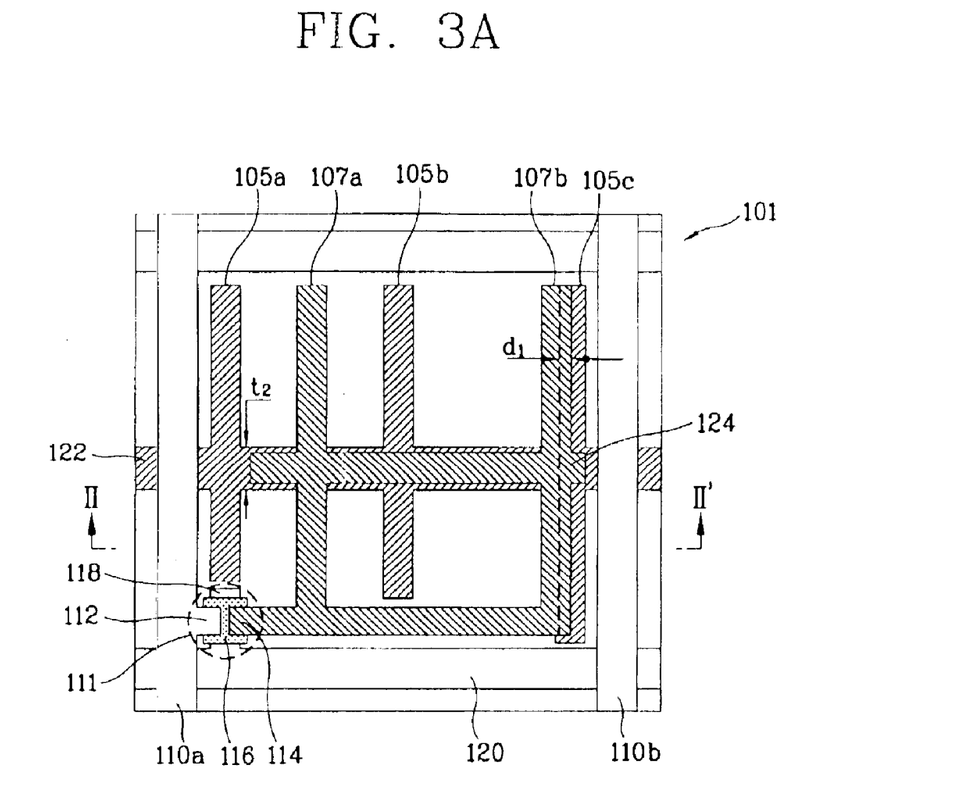
FIGS. 3A and 3B show a structure of an in-plane switching mode liquid crystal display device in accordance with a first exemplary embodiment of the present invention.
Figure 3B:
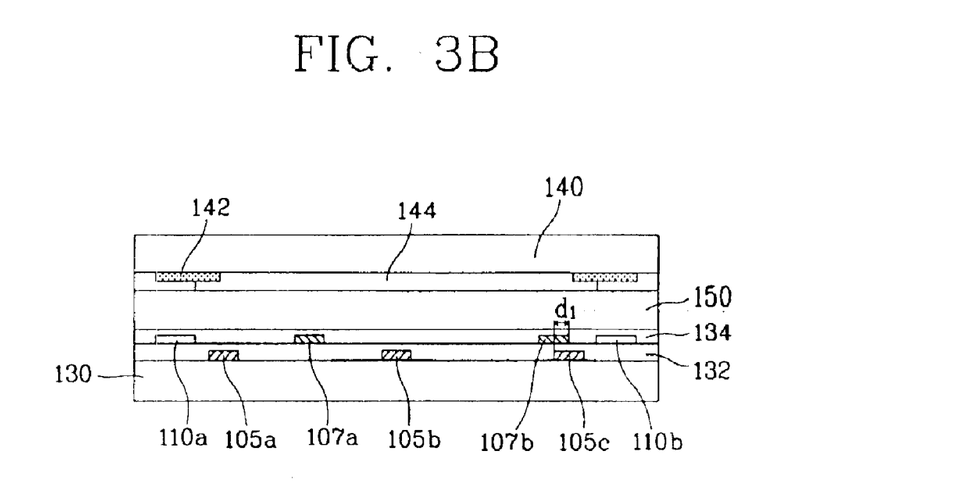

FIG. 3A is a sectional view illustrating an IPS mode liquid crystal display device in accordance with a first exemplary embodiment of the present invention, FIG. 3B is a sectional view taken along line II–II' in FIG. 3A. The IPS mode liquid crystal display device is similar to a 4-block liquid crystal display device. Actually, however, the IPS mode liquid crystal display device is a 3-block liquid crystal display device as shown in FIGS. 3A and 3B, but it is called a 4-block liquid crystal display device like the related art liquid crystal display device for descriptive purposes. In a liquid crystal display device, a plurality of data lines 110 and gate lines 120 are generally arranged to have a plurality of pixels, but, in FIGS. 3A and 3B, only one pixel is shown for descriptive convenience.

As depicted in FIG. 3A, a thin film transistor is formed at a cross point of a data line 110a and a gate line 120. The thin film transistor 111 includes a gate electrode 118 extended from the gate line 120, a semiconductor layer 116 formed on the gate electrode 118, a source electrode 112 extended from the data line 110 on the semiconductor layer 116, and a drain electrode 114. In a pixel, there are three parallel common electrodes 105a–105c and two pixel electrodes 107a, 107b. The first through third common electrodes 105a–105c are contacted to a common line 122 arranged in a pixel. First and second pixel electrodes 107a, 107b are contacted to a pixel electrode line 124 arranged in the pixel.

As depicted in FIG. 3B, the first through third common electrodes 105a–105c are formed on a first substrate 130 of a transparent material such as glass. The first and second pixel electrodes 107a, 107b are formed on a gate insulating layer 132 formed on the first substrate 130. In addition, not shown in FIG. 3B, a gate electrode 118 of the thin film transistor 111 is formed on the first substrate 130, a semiconductor layer 116 is formed on the gate insulating layer 132, and the source electrode 112 and the drain electrode 114 are formed on the semiconductor layer 134. As described above, the common electrodes 105a–105c and the gate electrode 118 are formed on the first substrate 130, metal such as Cu, Al, Al alloy is laminated by a sputtering or an evaporating method, and is etched as a single layer or plural layers. Herein, it is possible to make common electrodes 105a–105c and the gate electrode 118 of different metals. However, it is may be formed make them of the same metal by the same process.

In addition, the pixel electrodes 107a, 107b, the source electrode 112, and the drain electrode 114 are respectively formed on the semiconductor layer 116 and the gate insulating layer 132. The pixel electrodes 107a, 107b, the source electrode 112, and the drain electrode 114 can be formed by laminating metal such as Cr, Mo, Cu, Al, Al alloy, etc. by a sputtering or an evaporating method and etching them with an etchant as an etched single layer or plural layers. While it is possible to make them of the same material by the same process, it is also possible to make them of different material by different process.

In the meantime, on a second substrate 140 opposed to the first substrate 130, a black matrix 142 for preventing light from being leaked to a region between pixels or a thin film transistor region and a color filter layer 144 for implementing an actual color are formed. Then, a liquid crystal layer 150 is formed between the first and second substrates 130, 140 by injecting liquid crystal. In general, the liquid crystal layer 150 is formed by injecting liquid crystal between the first and second substrates 130, 140 adhered with each other by a vacuum-injecting process. Also, the liquid crystal layer 150 may be formed by a liquid crystal dispensing process to dispense liquid crystal directly onto the first substrate 130 or second substrate 140 before adhering the substrates with each other.

In the above-described 4-block IPS mode liquid crystal display device, as depicted in drawings, there are three common electrodes 105a–105c and two pixel electrodes 107a, 107b in a pixel. Herein, two common electrodes, namely, the first and third common electrodes 105a, 105c are arranged abutting on data lines 110a, 110b to minimize electric field influences from the data lines 10a, 10b. In particular, in the IPS mode liquid crystal display device in accordance with the present invention; the third common electrode 105c arranged abutting on the data line 10b is overlapped with a portion of the second pixel electrode 107b. Because two blocks are united as one block by the overlap of the third common electrode 105c and the second pixel electrode 107b, the 4-block liquid crystal display device is effectively changed into a 3-block liquid crystal display device. As a result, the aperture ratio is improved in accordance with the pertinent overlap region.

The overlap of the common electrode 105c and the pixel electrode 107b generates a storage capacitor. In more detail, a storage capacitor is generated not only between the common line 122 and the pixel electrode line 124, but also between the overlapped common electrode 105c and the pixel electrode 107b. Accordingly, a storage capacitor required for one pixel is set as a specific value. It is required for the common line 122 and the pixel electrode line 124 to generate a storage capacitor corresponding to a value calculated by subtracting the storage capacitor between the overlapped common electrode 105c and the pixel electrode 107b from the set specific value. Thus, it is possible to decrease the storage capacitor generated by the common line 122 and the pixel electrode line 124, and therefore, decrease a width of the common line 122 and the pixel electrode line 124. In the related art IPS mode liquid crystal display device depicted in FIG. 2A, a width of the common line 122 is t1. On the other hand, in the IPS mode liquid crystal display device depicted in FIG. 3A, a width of the common line 122 is t2. As a result, it is possible to obtain width decrease effect as t1–t2. Herein, a width of the common line 122 can be decreased also. In general, the pixel electrode line 124 has a width smaller or greater than that of the common line 122, when the pixel electrode line 124 has the same width with the common line 122, a width of the pixel electrode line 124 is decreased also. By the width decrease of the common line (and pixel electrode line), light transmittance region can be increased.

As described above, the light transmittance region is increased by the overlap of the common electrode 105c and the pixel electrode 107b, an aperture ratio can be improved in comparison with that of the related art IPS mode liquid crystal display device. Herein, overlap range of the common electrode 105c and pixel electrode 107c is not limited specifically. In general, because the first and third common electrodes 105a, 105c arranged abutting on the data lines 110a, 110b are respectively aligned between the first and second pixel electrodes 107a, 107b, and between the data lines 110a, 110b to prevent the data lines 110a, 119b from influencing the first and second pixel electrodes 107a, 107b, at least a portion of the third common electrode 105c is arranged between the second pixel electrode 107b and the data line 110b. In consideration of that, the common electrode 105c and the pixel electrode 107b may not to be completely overlapped with each other. In addition, it is also possible to have the integer number of common electrodes greater than the number of pixel electrodes by one.

Figure 4:
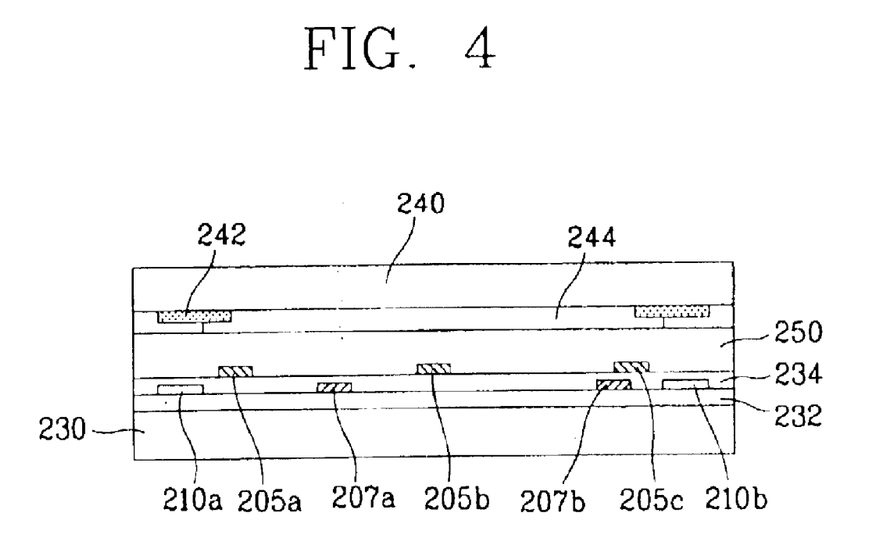
FIG. 4 shows a structure of an in-plane switching mode liquid crystal display device in accordance with a second exemplary embodiment of the present invention.

In FIGS. 3A and 3B, the first through third common electrodes 105a–105c and the common line 122 are formed on the substrate 130. The first and second pixel electrodes 107a, 107b and the pixel electrode line 124 are formed on the gate insulating layer 132. However, the present invention is not limited by that. FIG. 4 illustrates a second exemplary embodiment of the present invention. It is an IPS mode liquid crystal display device having different structure from the IPS mode liquid crystal display device shown in FIG. 3.

As depicted in drawings, first through third common electrodes 205a–205c are formed on a passivation layer 234, first and second pixel electrodes 207a, 207b and a data line 210 are formed on a gate insulating layer 232. Not shown in drawings, a common line is formed on a first substrate 230 or the passivation layer 234. When the common line is formed on the first substrate 230, the common line may be made of the same metal with a gate electrode of a thin film transistor. When the common line is formed on the passivation layer 234, it may be made of the same metal by the same process with the common electrodes 205a–205c. Herein, when the common line is formed on a layer different from the common electrodes 205a–205c, namely, the first substrate 230, the common line and the common electrodes 205a–205c are electrically connected through a contact hole (not shown) formed on the gate insulating layer 232 and the passivation layer 234.

In the above-described embodiment, because the third common electrode 205c abutting on the data line 210b is overlapped with the second pixel electrode 207b, light transmittance region is increased, and accordingly an aperture ratio of the IPS mode liquid crystal display device can be improved.

Figure 5:
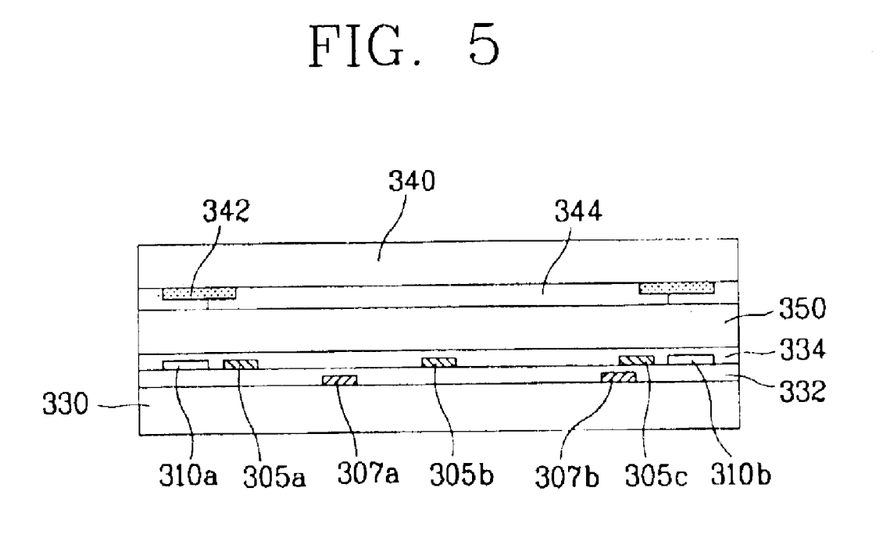
FIG. 5 shows a structure of an in-plane switching mode liquid crystal display device in accordance with a third exemplary embodiment of the present invention.

FIG. 5 shows a structure of an in-plane switching mode liquid crystal device in accordance with a third exemplary embodiment of the present invention. As depicted in FIG. 5, first through a third common electrodes 305a–305c are formed on a gate insulating layer 332, and first and second pixel electrodes 307a, 307b are formed on a first substrate 330. Herein, because the third common electrode 305c is overlapped with a portion of the second pixel electrode 307b, an aperture ratio of the liquid crystal display device can be improved.

In the first through third exemplary embodiments of the present invention, by increasing light transmittance region by overlapping a common electrode abutting on a data line with a pixel electrode, an aperture ratio of the liquid crystal display device can be improved. Herein, as depicted in drawings, the common electrodes and the pixel electrodes may be formed everywhere on a first substrate, a gate insulating layer and a passivation layer. In the embodiments, positions of the common electrodes and the pixel electrodes may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims.

In other words, in the present invention, the common electrodes and the pixel electrodes may be formed on all possible positions (layers). In addition, to further improve an aperture ratio, at least one of the common electrode and the pixel electrode can be made of ITO (indium tin oxide) or IZO (indium zinc oxide) as transparent metal.

In the meantime, in the IPS mode liquid crystal display device in accordance with the present invention, overlapped common electrode and pixel electrode are not limited by specific pixel electrode and pixel electrode. In more detail, in one pixel, any common electrode and pixel electrode may be overlapped with each other, by the overlap of the common electrode and the pixel electrode, an aperture ratio of the IPS mode liquid crystal display device can be improved. In addition, in the present invention, it is possible to overlap not less than two common electrode and pixel electrode with each other. In the above-described liquid crystal display device, because only one common electrode and pixel electrode are overlapped with each other, but it is also possible to overlap not less than one common electrode and pixel electrode with each other.

Figure 6:
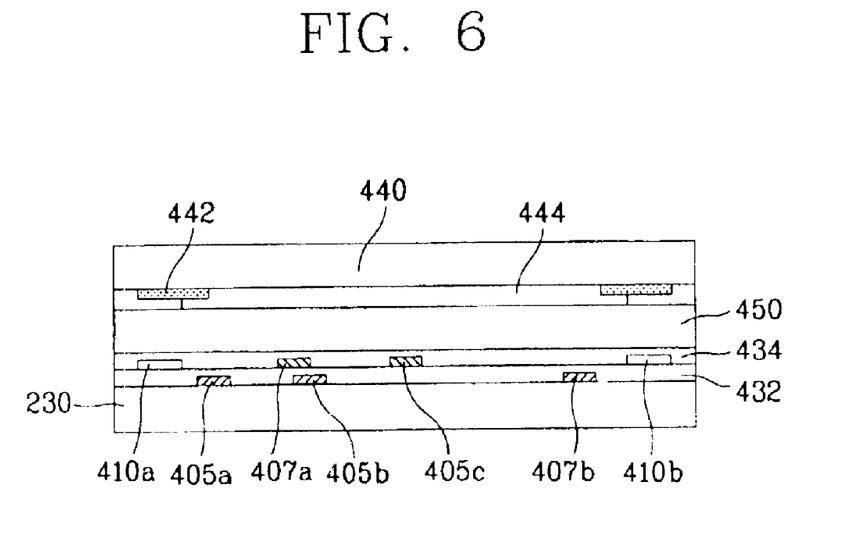
FIG. 6 shows a structure of an in-plane switching mode liquid crystal display device in accordance with a fourth exemplary embodiment of the present invention.
Figure 7:
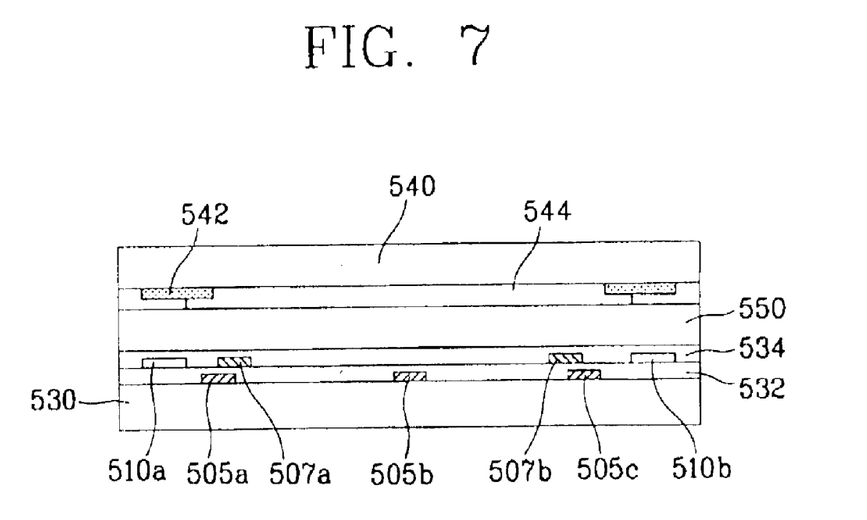
FIG. 7 shows a structure of an in-plane switching mode liquid crystal display device in accordance with a fifth exemplary embodiment of the present invention.

FIGS. 6 and 7 respectively show IPS mode liquid crystal display devices in accordance with fourth and fifth exemplary embodiments of the present invention. FIG. 6 shows the liquid crystal display device in which a second common electrode 405b is overlapped with a first pixel electrode 407a. FIG. 7 shows the liquid crystal display device in which a first common electrode 505a is overlapped with a first pixel electrode 507a. As depicted in the drawings, in the IPS mode liquid crystal display device in accordance with the present invention, all feasible common electrodes and pixel electrodes may be overlapped with each other, and accordingly an aperture ratio of the liquid crystal display device can be improved.

However, in the liquid crystal display devices in accordance with the first through fifth embodiments of the present invention, only a common electrode and a pixel electrode arranged on one side of a pixel are overlapped with each other, following problems can occur.

In the IPS mode liquid crystal display device depicted in FIG. 3A, only the third common electrode 105c and the second pixel electrode 107b arranged on the right side of the pixel are overlapped with each other. Accordingly, an interval between the pixel electrode 107a and the data line 110a in the left side is different from an interval between the pixel electrode 107b and the data line 110b in the right side. Even the first common electrode 105a and the third common electrode 105c are respectively arranged around the data lines 110a, 110b to shield the electric field effect due to the data lines 110a, 110b, it is actually impossible to shield the electric field effect completely. Accordingly, there is minute change in the horizontal electric field formed in the pixel by the data lines 110a, 110b. When an interval between the first common electrode 105a and the data line 110a is different from an interval between the third common electrode 105c and the data line 110b, there is a difference between horizontal electric fields in the right and left sides of the pixel. Accordingly, flicker may occur on the display screen.

In the meantime, each construction portion of the liquid crystal display device, for example, the thin film transistor 111, the gate line 120, the data line 110, the common electrode 105 and the pixel electrode 107, etc. are formed by a photo-lithography method. In the photolithography, materials, such as metals, are laminated, and the laminated materials are etched as a desired pattern using a mask. By the etching process using the mask, the gate electrode 118, the gate line 120, and the common electrodes 105a–105C of the thin film transistor are formed simultaneously, and the source electrode 112, the drain electrode 114, the data line 110, and the pixel electrodes 107a, 107b are simultaneously formed. In the etching process, each construction portion is formed by aligning a mask using a maker. Herein, when the mask alignment does not exceed an error limit, a fabricated liquid crystal display device can satisfy a quality standard. However, when the mask alignment exceeds an error limit, a fabricated liquid crystal display device is defective.

Figure 8:
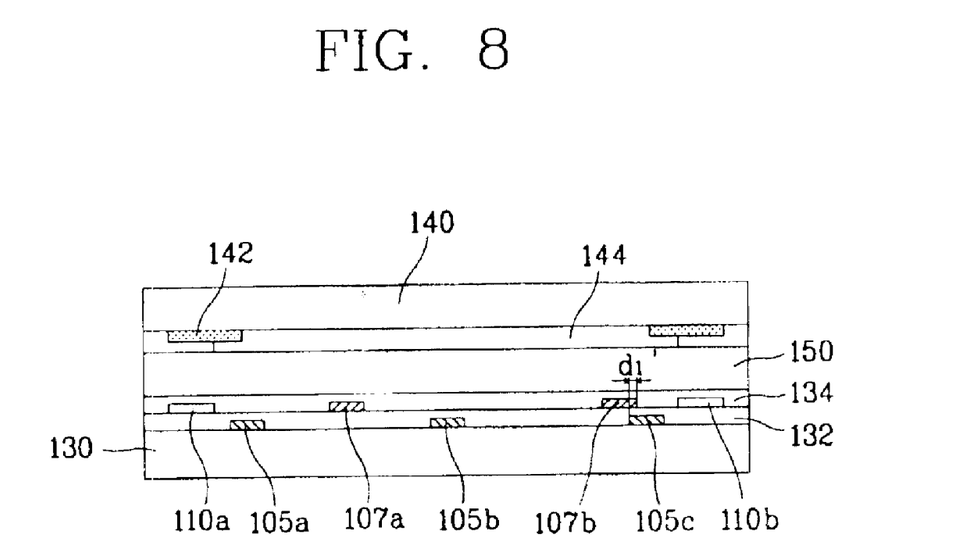
FIG. 8 shows a mis-alignment occurring in a common electrode or a pixel electrode of an in-plane switching mode liquid crystal display device in accordance with the present invention.

However, when mis-alignment of the mask does not exceed a certain range, the pixel electrodes 107a, 107b arranged in the pixel can be minutely separated from set positions. In that case, an overlap region of the third common electrode 105c and the second pixel electrode 107b is decreased or increased in comparison with an overlap region in FIG. 3. FIG. 8 shows an IPS mode liquid crystal display device formed by mis-alignment of the mask. In the IPS mode liquid crystal display device in FIG. 8, an overlap region of the third common electrode 105c and the second pixel electrode 107b is decreased by mis-alignment of the mask (namely, d1>d1' with d1 being the overlap in FIG. 7), and a storage capacitor generated by the third common electrode 105c and the second pixel electrode 107b is decreased due to the overlap region decrease.

In the meantime, a storage capacitor in a pixel is set as a specific value, and it is calculated by adding a storage capacitor formed by the common line 122 and the pixel electrode line 124 to a storage capacitor formed by the common electrodes 105a–105c and the pixel electrodes 107a, 107b. Accordingly, as described above, when a storage capacitor is decreased due to overlap region decrease of the third common electrode 105c and the second pixel electrode 107b, a total storage capacitor formed in the pixel is smaller than the set storage capacitor, and accordingly defection occurs in the liquid crystal display device.

Figure 9A:
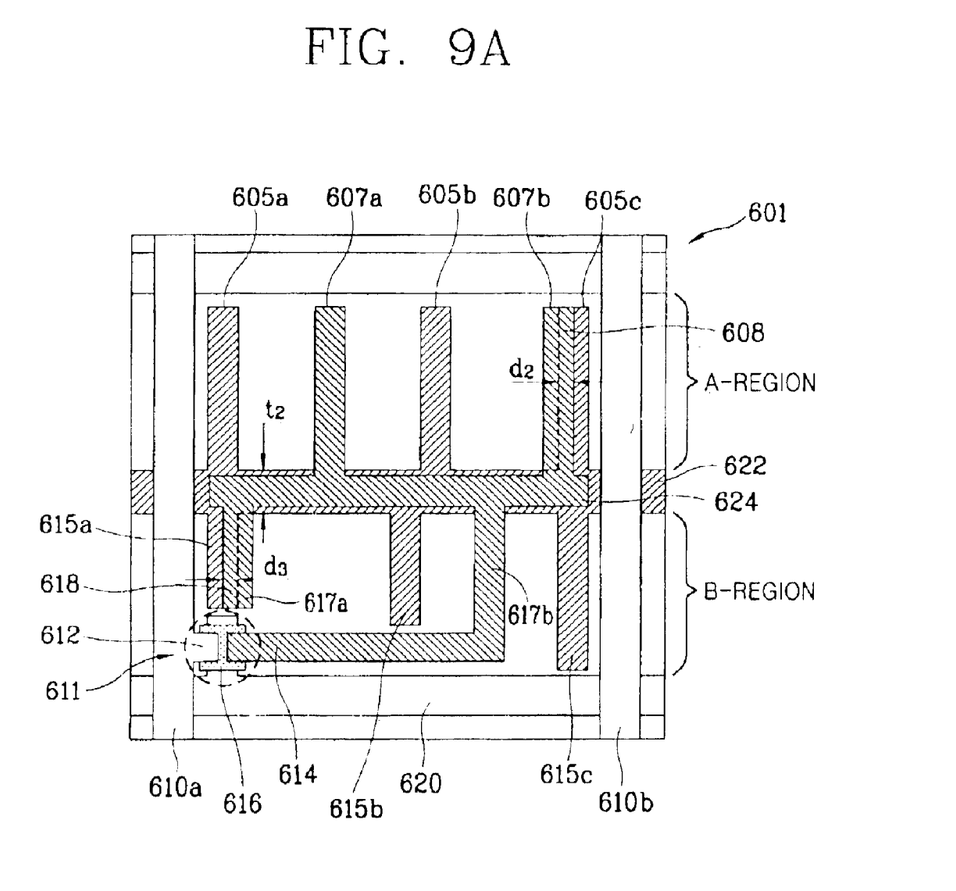
FIGS. 9A and 9B show a structure of an in-plane switching mode liquid crystal display device in accordance with a sixth exemplary embodiment of the present invention.
Figure 9B:
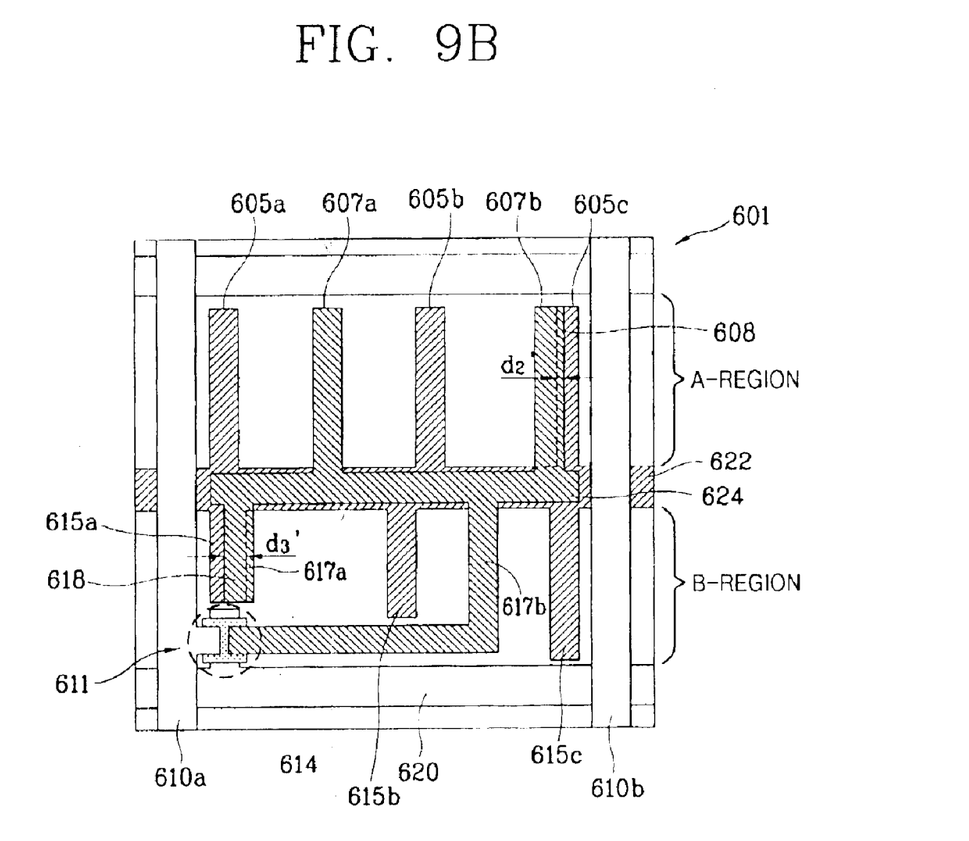

FIGS. 9A and 9B show an IPS mode liquid crystal display device in accordance with a sixth exemplary embodiment of the present invention. In the liquid crystal display device, it is possible to solve a problem occurred by overlapping a common electrode with a pixel electrode in one side.

As depicted in FIG. 9A, the IPS mode liquid crystal display device in accordance with the sixth embodiment has a similar configuration as the IPS mode liquid crystal display device in FIG. 3A except common electrodes 605a–605c and pixel electrodes 607a, 607b. Accordingly, description about other elements will be abridged, and only the common electrodes 605a–605c and pixel electrodes 607a, 607b will be described. In addition, in the sixth exemplary embodiment, for descriptive convenience, upper and lower regions centering around a common line 622 and an pixel electrode line 624 will be separately described as an A region and a B region.

As depicted in FIG. 9A, in the IPS mode liquid crystal display device in accordance with the sixth exemplary embodiment, the third common electrode 605c and the second pixel electrode 607b in the right A region are respectively overlapped with a portion of a first common electrode 615a and a first pixel electrode 617a in the left B region, and a first and a second overlap regions respectively having a d2 width and a d3 width are formed. Because the first and second overlap regions actually have the same area with the overlap regions formed in the IPS mode liquid crystal display device in FIG. 3, an equivalent storage capacitor is generated. Herein, it is possible to reverse left-right positions of the common electrodes and pixel electrodes overlapped in the A and B regions. For example, in the overlap region of the A region, when the common electrode is arranged on the left and the pixel electrode is arranged on the right, in the overlap region of the B region, the common electrode is arranged on the right, and the pixel electrode is arranged on the left.

As described above, when the overlap regions of the common electrodes and the pixel electrodes are formed on the left and right of the pixel symmetrically, because an interval between a data line 610a of the pixel arranged on the left and the first pixel electrode 617a is the same with an interval between the data line 610b of an adjacent pixel arranged on the right and the first pixel electrode 607b in the A region, electric field influences of the data lines 610a, 610b affect on the pixel electrodes 607a, 617a identically, flicker can be prevented in the IPS mode liquid crystal display device.

In the meantime, in the photo-lithography process (pixel electrode or common electrode process), when a minute mis-alignment of the mask occurs, the pixel electrode or the common electrode is deviated from a set position, overlap region of the common electrode and the pixel electrode is changed. FIG. 9B shows an IPS mode liquid crystal display device in a mask mis-alignment state. In the IPS mode liquid crystal display device shown in FIG. 9B, pixel electrodes 607a, 607b, 617a, 617b are deviated from set positions due to the mask misalignment, the pixel electrodes 607a, 607b, 617a, 617b are moved to the left.

As depicted in FIG. 9B, by the movement of the pixel electrodes 607a, 607b, 617a, 617b, the third common electrode 605c and the second pixel electrode 607b in the A region form a first overlap region having a d2' width, and the first common electrode 615a and the first pixel electrode 617a forms a second overlap region having a d3' width. Herein, d2' is smaller than d2 in FIG. 9A (d2'<d2) by the movement of the pixel electrode 607b to the left, and d3' is greater than d3 (d3'>d3). Because the pixel electrodes 607a, 607b, 617a, 617b move the same distance in the pixel, width decrease value (d2'-d2) in the first overlap region is the same with width increase of the second overlap region (d2'-d2=d3'-d3). Accordingly, although the pixel electrode (or the common electrode) is minutely moved by the mask mis-alignment, the sum total of the first overlap regions and the second overlap region is maintained constant (namely, d2+d3=d2'+d3') so that the storage capacitor generated by the overlap regions 608, 618 is maintained constant.

As described above, in the embodiment, by symmetrically overlapping the common electrode with the pixel electrode on the left and right sides in the pixel, an interval between the data line and the pixel electrode is always maintained uniformly. Thus, electric field influence by the data line can be maintained uniformly even though displacement occurs in a position of the pixel electrode or the common electrode by the mask mis-alignment. By uniformly forming a storage capacitor, it is possible to prevent defection of the IPS mode liquid crystal display device.

In the meantime, there is no limitation in determining of a common electrode and a pixel electrode overlapped with each other in a pixel symmetrically. If overlap regions are formed symmetrically in the pixel, any common electrode and pixel electrode arranged in the pixel can be overlapped.

Figure 10:
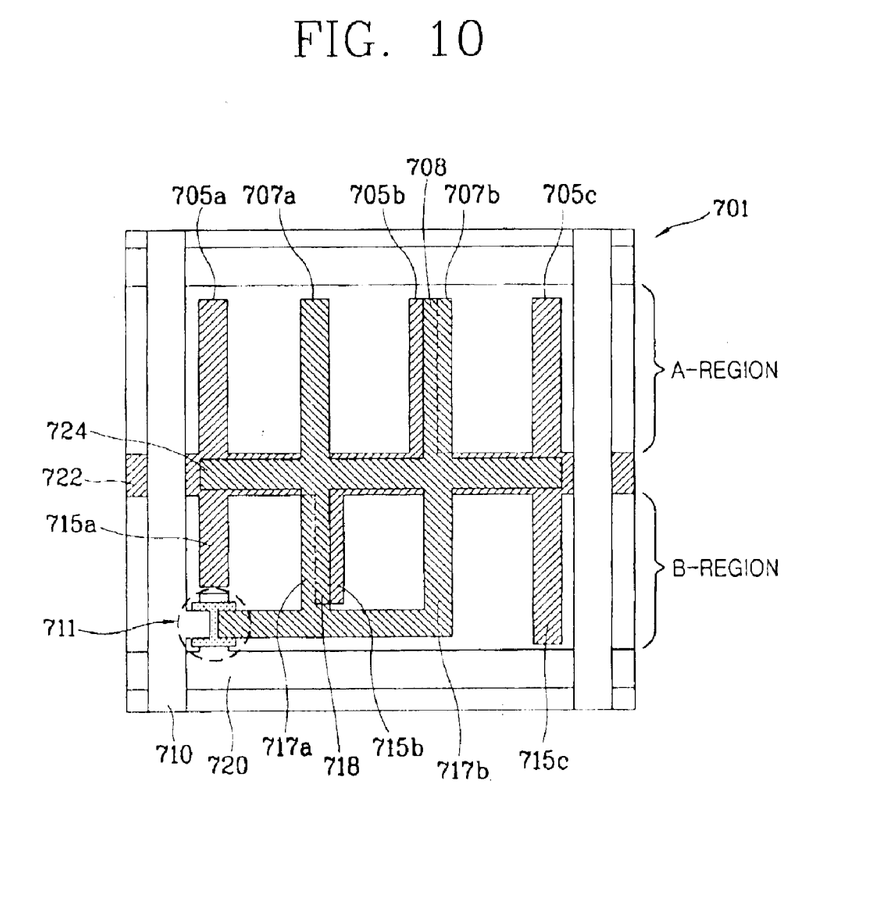
FIG. 10 shows a structure of an in-plane switching mode liquid crystal display device in accordance with a seventh exemplary embodiment of the present invention.

FIG. 10 shows an IPS mode liquid crystal display device in accordance with a seventh exemplary embodiment of the present invention. As depicted in FIG. 10, a common electrode and a pixel electrode are overlapped with each other in an A region and a B region divided centering around a common line 722 and a pixel electrode line 724. However, different from the IPS mode liquid crystal display device depicted in FIG. 9A, in the IPS mode liquid crystal display device in accordance with the seventh exemplary embodiment, a second common electrode 705b is overlapped with a second pixel electrode 707b in the A region, and a first overlap regions is formed. In the B region, the second common electrode 705b is overlapped with a first pixel electrode 707a, and a second overlap region is formed. Herein, the first and second overlap regions 708, 718 are symmetrically formed in the pixel. Hence, even if the mask is mis-aligned in the photo-lithography process, a storage capacitor can be uniformly formed. Accordingly, the IPS mode liquid crystal display device in accordance with the seventh exemplary embodiment can have the same effect with the IPS mode liquid crystal display device depicted in FIG. 9A.

Figure 11:
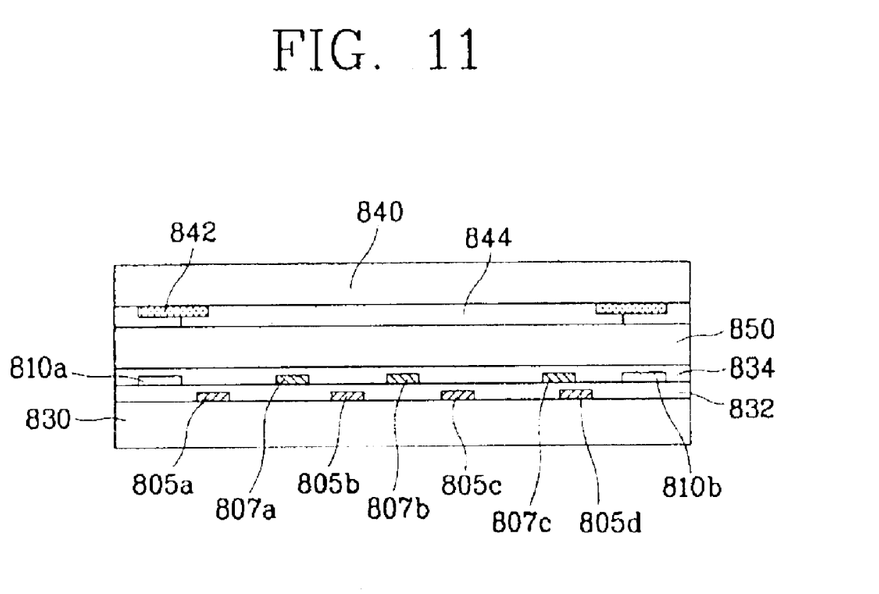
FIG. 11 shows a structure of an in-plane switching mode liquid crystal display device in accordance with an eighth exemplary embodiment of the present invention.

In addition, the IPS mode liquid crystal display device in accordance with the present invention is not limited by 4-block (formed of three common electrodes and two pixel electrodes) liquid crystal display device, but it may be applied to various block types liquid crystal display device. FIG. 11 shows an IPS mode liquid crystal display device in accordance with an eighth exemplary embodiment of the present invention. It shows a structure of a 6-block (formed of four common electrodes and three pixel electrodes) liquid crystal display device. Herein, FIG. 11 shows the liquid crystal display device in which common electrodes 805a–805d are overlapped with pixel electrodes 807a–807c asymmetrically. However, the embodiment can be also applied to a liquid crystal display device in which the common electrodes 805a–805d are overlapped with the pixel electrodes 807a–807c symmetrically. In the 6-block (actually 5-block) IPS mode liquid crystal display device, because at least one common electrode 805d and the pixel electrode 807c may be overlapped with each other, light transmittance region in the pixel is increased, and an aperture ratio of the liquid crystal display device can be improved.

As described above, in the IPS mode liquid crystal display device in accordance with the present invention, by overlapping at least one common electrode with a pixel electrode in a pixel, light transmittance region in the pixel is increased, and an aperture ratio of the liquid crystal display device can be improved. In addition, in the IPS mode liquid crystal display device in accordance with the present invention, by forming an overlap region of a common electrode and a pixel electrode in a pixel symmetrically, electric field effect of a data line can be maintained uniformly along the total pixels. Thus, flicker can be prevented in the IPS mode liquid crystal display device. Furthermore, in the IPS mode liquid crystal display device in accordance with the present invention, even if there is displacement in position forming of a common electrode and a pixel electrode, by always uniformly maintaining the overlap region, a storage capacitor of the pixel can be maintained uniformly.

It will be apparent to those skilled in the art that various modifications and variations can be made in the apparatus and method of generating gamma voltage of the present invention without departing from the spirit or scope of the invention. Thus, it is intended that the present invention cover the modifications and variations of this invention provided they come within the scope of the appended claims and their equivalents.

What is claimed is:

1. An in-plane switching mode liquid crystal display device, comprising:
   a substrate,
   at least two gate lines disposed on the substrate;
   at least two data lines disposed on the substrate crossing the gate lines to define a pixel region;
   a driving device disposed in the pixel region;
   a plurality of first electrodes disposed in the pixel region; and
   a plurality of second electrodes disposed in the pixel region parallel with the first electrodes and at least one first electrode being overlapped with at least one second electrode along substantially an entire length thereof, each one of the first electrodes and a corresponding one of second electrodes defining an electric field in a direction parallel to a surface of the substrate.

2. The device according to claim 1, wherein the first electrodes form at least a portion of a common electrode, and the second electrodes form at least a portion of a pixel electrode.

3. The device according to claim 1, wherein at least one of the first electrode is disposed substantially parallel to and abutting the data line.

4. The device according to claim 1, wherein the pixel region includes one more of the first electrodes than of the second electrodes.

5. The device according to claim 4, wherein the pixel region includes three (3) first electrodes and two (2) second electrodes.

6. The device according to claim 4, wherein the pixel region includes four (4) first electrodes and three (3) second electrodes.

7. The device according to claim 1, wherein an overlap region defined by the at least one first electrode being overlapped with at least one second electrode defines a storage capacitor.

8. The device according to claim 1, further comprising:
   a first line disposed at least partially in the pixel region electrically connected to the first electrodes; and
   a second line disposed at least partially in the pixel region electrically connected to the second electrode.

9. The device according to claim 8, wherein the first line defines a common electrode line, and the second line defines a pixel electrode line.

10. The device according to claim 8, wherein the first line overlaps with the second line to define a storage capacitor.

11. The device according to claim 1, wherein the driving device includes a thin film transistor.

12. The device according to claim 11, wherein the thin film transistor includes:
   a gate electrode disposed on the substrate;
   an insulating layer disposed on the substrate;
   a semiconductor layer disposed on the insulating layer;
   a source electrode disposed on the semiconductor layer in electrical contact with the semiconductor layer;
   a drain electrode disposed on the semiconductor layer in electrical contact with the semiconductor layer; and
   a passivation layer over the substrate having the semiconductor layer, the source electrode, and the drain electrode.

13. The device according to claim 12, wherein one of the first electrodes is disposed on the insulating layer.

14. The device according to claim 12, wherein one of the first electrodes is disposed on the passivation layer.

15. The device according to claim 12, wherein one of the second electrodes is disposed on the insulating layer.

16. The device according to claim 12, wherein one of the second electrodes is disposed on the passivation layer.

17. An in-plane switching mode liquid crystal display device, comprising:
   a substrate;
   at least two gate lines disposed on the substrate;
   at least two data lines disposed on the substrate crossing the gate lines to define a pixel region;
   a driving device defined in the pixel region;
   at least one first line disposed in the pixel region;
   at least one second line disposed in the pixel region, the first and second line defining a first storage capacitor and dividing the pixel region into first and second regions;
   a plurality of first electrodes disposed in the pixel region substantially parallel to the data lines and connected with the first line; and
   a plurality of second electrodes disposed in the pixel region substantially parallel to the data lines and connected with the second line, at least two of the first electrodes respectively overlap at least two second electrodes thereby forming at least two overlap regions along substantially entire lengths of the respective first and second electrodes to define a second storage capacitor.

18. The device according to claim 17, wherein the first line defines a common electrode line, and the second line defines a pixel electrode line.

19. The device according to claim 17, wherein the first electrodes form at least a portion of a common electrode, and the second electrodes form at least a portion of a pixel electrode.

20. The device according to claim 17, wherein the two overlap regions are symmetric with each other.

21. The device according to claim 20, wherein a sum total of the first overlap region and the second overlap region is constant with respect to a mask mis-alignment during formation in a direction substantially perpendicular to the direction in which the first and second electrodes are arranged.

22. The device according to claim 21, wherein a capacitance of the second storage capacitor is constant with respect to the mask mis-alignment during formation.

23. The device according to claim 17, wherein at least one of the first electrodes is disposed substantially parallel to and abutting the data line.

24. The device according to claim 17, wherein the number of the first electrodes is one greater than the number of the second electrodes.

25. The device according to claim 17, wherein the driving device includes a thin film transistor.

26. The device according to claim 25, wherein the thin film transistor includes:
   a gate electrode disposed on the substrate;
   an insulating layer disposed on the substrate;
   a semiconductor layer disposed on the insulating layer;
   a source electrode disposed on the semiconductor layer in electrical contact with the semiconductor layer;
   a drain electrode disposed on the semiconductor layer in electrical contact with the semiconductor layer; and
   a passivation layer over the substrate having the semiconductor layer, the source electrode, and the drain electrode.

27. The device according to claim 26, wherein one of the first electrodes is disposed on one of the insulating layer and the passivation layer.

28. The device according to claim 26, wherein one of the second electrodes is disposed on one of the insulating layer and the passivation layer.

29. The device according to claim 17, wherein positions of one of the first electrodes and the second electrode are alternated in the each of first and second regions.

30. An in-plane switching mode liquid crystal display device, comprising:
   a plurality of pixel regions defined by a plurality of gate lines crossing with a plurality data lines;
   a driving device in each pixel region; and
   a plurality of first electrodes and second electrodes arranged parallel with each other in each pixel region to form an electric field in a plane defined by the crossing gate and data lines, at least two first electrodes and at least two second electrodes being overlapped to define a first and second overlap regions, the first and second overlap regions being symmetric with each other so that a sum total of the first overlap region and the second overlap region is constant with respect to a mask mis-alignment during formation in a direction substantially perpendicular to the direction in which the first and second electrodes are arranged.

31. The device according to claim 30, further comprising:
   a first line disposed at least partially in the pixel region electrically connected to at least one of the first electrodes; and
   a second line disposed at least partially in the pixel region electrically connected to at least one of the second electrodes.

32. The device according to claim 31, wherein a capacitance defined by first and second overlap regions is constant with respect to the mask mis-alignment during formation.

33. An in-plane switching mode liquid crystal display device, comprising:
   a substrate;
   at least two gate lines disposed on the substrate;
   at least two data lines disposed on the substrate crossing the gate lines to define a pixel region;
   a driving device defined in the pixel region;
   at least one first line disposed in the pixel region;
   at least one second line disposed in the pixel region, the first and second line defining a first storage capacitor and dividing the pixel region into first and second regions;
   a plurality of first electrodes disposed in the pixel region substantially parallel to the data lines and projected from the first line; and
   a plurality of second electrodes disposed in the pixel region substantially parallel to the data lines and the first electrodes, the second electrodes projected from the second line with at least one second electrode being overlapped with at least one first electrode along substantially an entire length thereof.

34. The device according to claim 1, wherein the plurality of first electrodes are parallel with one of the gate lines and the data lines.

* * * * *